(12) United States Patent
Koga et al.

(10) Patent No.: US 10,926,310 B2
(45) Date of Patent: Feb. 23, 2021

(54) ENDLESS METAL RING MANUFACTURING METHOD AND ENDLESS METAL RING RESIN REMOVAL DEVICE

(71) Applicant: TOYOTA JIDOSHA KABUSHIKI KAISHA, Toyota (JP)

(72) Inventors: Mitsue Koga, Toyota (JP); Tomohiko Nishiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/130,243

(22) Filed: Sep. 13, 2018

(65) Prior Publication Data

US 2019/0009316 A1 Jan. 10, 2019

Related U.S. Application Data

(62) Division of application No. 14/765,185, filed as application No. PCT/JP2013/063260 on May 13, 2013, now abandoned.

(51) Int. Cl.
*B21B 45/02* (2006.01)
*B08B 3/12* (2006.01)
(Continued)

(52) U.S. Cl.
CPC ............ *B21B 45/0275* (2013.01); *B08B 3/12* (2013.01); *B08B 3/123* (2013.01); *B21H 1/06* (2013.01);
(Continued)

(58) Field of Classification Search
CPC . Y10T 29/49819; B21B 45/0275; B08B 3/12; B08B 3/123; B21H 1/06;
(Continued)

(56) References Cited

U.S. PATENT DOCUMENTS 3,557,807 A * 1/1971 Schipke .................... B08B 3/12
   134/1
5,672,212 A * 9/1997 Manos .............. H01L 21/67023
   134/1.3
(Continued)

FOREIGN PATENT DOCUMENTS

EP   1 284 174 A1   2/2003
JP   4-203205 A     7/1992
(Continued)

OTHER PUBLICATIONS

Carbon Tetrachloride https://web.archive.org/web/20100114172657/ http://chemicalland21.com/industrialchem/organic/CARBON% 20TETRACHLORIDE.htm (Jan. 14, 2010).
(Continued)

*Primary Examiner* — Jacob J Cigna
*Assistant Examiner* — Michael W Hotchkiss
(74) *Attorney, Agent, or Firm* — Oblon, McClelland, Maier & Neustadt, L.L.P.

(57) ABSTRACT

Provided is an endless metal ring manufacturing method for manufacturing an endless metal ring by carrying out a barrel polishing step for polishing the endless metal ring by using a barrel of a resin material, a rolling step for rolling the endless metal ring which was cleaned, and a nitriding step for nitriding the endless metal ring which was rolled, wherein after the barrel polishing step and before the rolling step, provided is a resin removing step for removing resin that has adhered to the endless metal ring.

2 Claims, 13 Drawing Sheets

(51) Int. Cl.
*C21D 1/72* (2006.01)
*C21D 1/74* (2006.01)
*C23C 8/24* (2006.01)
*B21H 1/06* (2006.01)
*B21D 53/14* (2006.01)
*F16G 5/16* (2006.01)
*C21D 9/40* (2006.01)
*C21D 1/06* (2006.01)
*C21D 8/10* (2006.01)

(52) U.S. Cl.
CPC .................. *C21D 1/06* (2013.01); *C21D 1/72* (2013.01); *C21D 1/74* (2013.01); *C21D 9/40* (2013.01); *C23C 8/24* (2013.01); *F16G 5/16* (2013.01); *B21D 53/14* (2013.01); *C21D 8/10* (2013.01)

(58) Field of Classification Search
CPC .... C23C 8/24; C21D 1/74; C21D 1/06; C21D 9/40; C21D 1/72; C21D 8/10; F16G 5/16; B21D 53/14
See application file for complete search history.

(56) References Cited

U.S. PATENT DOCUMENTS

| | | | |
|---|---|---|---|
| 6,139,973 A | 10/2000 | Kawasaki et al. | |
| 6,782,898 B2 * | 8/2004 | Mizuno | B08B 3/047 134/1 |
| 8,815,020 B2 * | 8/2014 | Nishida | C21D 9/40 148/238 |
| 2002/0077033 A1 * | 6/2002 | Yajima | B24B 1/00 451/34 |
| 2003/0045387 A1 * | 3/2003 | Ishii | B24C 11/00 474/201 |
| 2005/0028368 A1 | 2/2005 | Yajima et al. | |
| 2011/0227424 A1 | 9/2011 | Yoshida et al. | |
| 2012/0291923 A1 | 11/2012 | Nishida et al. | |

FOREIGN PATENT DOCUMENTS

| | | | |
|---|---|---|---|
| JP | 5-331617 A | | 12/1993 |
| JP | 6 246246 | | 9/1994 |
| JP | H0763894 A | * | 3/1995 |
| JP | 11-50297 A | | 2/1999 |
| JP | 2002 187058 | | 7/2002 |
| JP | 2003 49906 | | 2/2003 |
| JP | 2004 162134 | | 6/2004 |
| JP | 2004162134 A | * | 6/2004 |
| JP | 2005 48051 | | 2/2005 |
| JP | 2005 155755 | | 6/2005 |
| JP | 2005155755 A | * | 6/2005 |
| JP | 2006 320859 | | 11/2006 |
| JP | 2007 152358 | | 6/2007 |
| JP | 2010-70834 A | | 4/2010 |
| JP | 2011-192910 A | | 9/2011 |

OTHER PUBLICATIONS

International Search Report Issued in PCT/JP2013/063260 dated Jul. 30, 2013.

* cited by examiner

FIG.15

| TEST No. | OUTPUT | | | | WORK SET JIG | RANK |
|---|---|---|---|---|---|---|
| | 1st TANK | 2nd TANK | 3rd TANK | 4th TANK | | |
| COMPARATIVE EXAMPLE | 8w/L | 8w/L | 8w/L | 8w/L | FIG.11 | 9 |
| TEST 1 | 8w/L | 8w/L | 8w/L | 8w/L | FIG.6 | 4 |
| TEST 2 | 8w/L | 8w/L | 8w/L | 8w/L | FIG.6 | 2 |
| TEST 3 | 24w/L | 24w/L | 24w/L | 24w/L | FIG.6 | 1 |
| TEST 4 | 24w/L | 24w/L | 24w/L | 24w/L | FIG.6 | 1 |

ENDLESS METAL RING MANUFACTURING METHOD AND ENDLESS METAL RING RESIN REMOVAL DEVICE

CROSS-REFERENCE TO RELATED APPLICATIONS

This application is a division of U.S. application Ser. No. 14/765,185 filed Jul. 31, 2015, the entire contents of which is incorporated herein by reference. U.S. application Ser. No. 14/765,185 is a 371 of International Application No. PCT/JP2013/063260 filed May 13, 2013.

TECHNICAL FIELD

The present invention relates to a method of manufacturing an endless metal ring for constituting a laminated ring mounted in a CVT belt, and relates to a technique of preventing generation of nitriding failure during manufacturing of the endless metal ring by improving a washing process and a washing method.

BACKGROUND ART

In recent years, there have been increased vehicles provided with a continuously variable transmission (CVT). By loading a CVT in a vehicle, a gear ratio on an engine output side can be controlled in a stepless manner, and fuel efficiency of a vehicle is enhanced. This is because stepless controlling of the gear ratio by the CVT can efficiently derive or produce engine power. The CVT is formed by a combination of laminated endless metal belts and a plurality of elements and the CVT is wound around an input side pulley and an output side pulley to transmit power. The input side pulley and the output side pulley are each provided with a pair of sheaves which steplessly can change each groove width between each pair of the sheaves, and thereby the input side pulley and the output side pulley can continuously change rotation ratios, i.e., gear ratio, at an input side and an output side in a stepless manner by varying the groove widths.

Because of the above-mentioned configuration of the CVT, an endless metal belt and an element used for the CVT are required to have highly precise dimension. Engine output is transmitted to the endless metal belt and the element, and therefore the endless metal belt and the element are repeatedly subject to an amount of load corresponding to engine operation. In view of strength and life expectancy, it has been avoided to mount the CVT in a vehicle with a high-power engine.

Patent Document 1 discloses a technique relating to a hoop for a CVT belt and a manufacturing method therefore. In polishing a hoop (an endless metal ring) for a CVT belt, barrel polishing is conducted using media made by mixing abrasive grains and a binder on condition that the abrasive grains are oxide-type and bulk specific gravity of the media is equal to or less than 2.0 or on condition that the abrasive grains are carbide-type and the bulk specific gravity of the media is equal to or less than 1.6. Accordingly, a size of foreign matter to be driven into the hoop is restricted.

Patent Document 2 discloses a technique relating to a manufacturing apparatus and a manufacturing method for an endless metal ring used for a continuously variable transmission. A polishing device for the endless metal ring includes an end face polishing device and an inner and outer circumferential surface polishing device. The inner and outer circumferential surface polishing device includes: a ring rotation roller for rotating the endless metal ring; an outer circumferential surface polishing roller to be brought in contact with an outer circumferential surface of the endless metal ring; an inner circumferential surface polishing roller to be brought in contact with an inner circumferential surface of the endless metal ring; and a constant-pressure applying actuator for moving the outer circumferential surface polishing roller and an inner circumferential side backup roller to change a clearance therebetween and surface pressures thereof and for moving the inner circumferential surface polishing roller and an outer circumferential side backup roller to change a clearance therebetween and surface pressures thereof. Owing to this configuration, it is possible to prevent unevenness in film pressure of nitride films to be formed on an endless metal ring surface by nitriding.

Patent Document 3 discloses a technique relating to a manufacturing method for a steel belt. This is a method for manufacturing a steel belt from a sheet material made of high-tensile steel. The method includes: a multiple deep drawing step in which a sheet material made of high-tensile steel is subjected to deep drawing and further to another deep drawing at least once or more at a different drawing ratio from the former drawing; and a cutting step in which an element processed in the multiple deep drawing step is circumferentially cut into a belt-like shape. According to this method, a steel belt with high strength can be manufactured without performing welding operation.

RELATED ART DOCUMENTS

Patent Documents

Patent Document 1: JP-A-2003-049906
Patent Document 2: JP-A-2005-155755
Patent Document 3: JP-A-2007-152358

SUMMARY OF INVENTION

Problems to be Solved by the Invention

Accompanied with progress in a CVT technology, there has been a demand for adapting CVTs to a high-powered engine, and enhancing life expectancy and endurance of a CVT belt has also been expected. However, when an endless metal ring to be used for a CVT belt is manufactured by using the technology disclosed in Patent Documents 1 to 3, those techniques have the following problems.

For forming an endless metal ring, every one of the Patent Documents 1 to 3 requires a cutting process and a cylindrically shaped element has to be cut with a predetermined width to make an endless metal ring. In cutting, burrs could be generated in any cutting methods, and therefore it is necessary to provide a process to remove thus generated burrs. In a method shown in the Patent Document 2, a removal process has to be performed for the endless metal rings one by one, requiring a long processing time, which could induce a cost problem. Accordingly, the present applicant employed a method of removing burrs from an endless metal ring by barrel polishing as indicated in the Patent Documents 1 and 3. However, it is confirmed that nitriding failure occurs with a certain probability when the endless metal ring is subjected to surface treatment by rolling and nitriding after the barrel polishing. Due to this nitriding failure of the endless metal ring, it is assumed that life expectancy and endurance of a CVT belt lower.

The present invention has been made in view of the circumstances to solve the above problem and has a purpose to provide an endless metal ring manufacturing method and an endless metal ring resin removal device which are capable of lowering a rate of nitriding failure of the endless metal ring.

Means of Solving the Problems

To achieve the above purpose, an endless metal ring manufacturing method according to one aspect of the present invention has the following features.

(1) One aspect of the invention provides an endless metal ring manufacturing method including: a barrel polishing step of polishing an endless metal ring by use of a barrel made of resin; a rolling step of rolling the endless metal ring having been washed; and a nitriding step of nitriding the rolled endless metal ring, wherein the manufacturing method further includes a resin removal step of removing the resin that has adhered to the endless metal ring.

According to the aspect described in the above (1), it is possible to lower the rate of nitriding failure of the endless metal ring. The applicant made a research with various washing conditions for the endless metal ring in nitriding the endless metal ring. As a result of the research, it is confirmed that there is a problem in removing the media used for barrel polishing. To be specific, the media is made by mixing resin material and polishing material, and the applicant has confirmed from the research result that the nitriding failure occurs because the nitriding is performed in a state that the resin material stays on a metal surface. The resin adhered to the metal surface obstructs nitrogen molecules from entering into the metal from the metal surface in the nitriding step, resulting in thinning a thickness of a nitrogen diffusion layer, so that the metal could be formed with portions with low surface strength in a mottled appearance. This is the nitriding failure to cause a product failure. Accordingly, by removing this resin extraneous matter, it is possible to reduce the nitriding failure of the endless metal ring.

(2) In the endless metal ring manufacturing method according to (1), preferably, the resin removal step is performed after the barrel polishing step and before the rolling step.

It is confirmed that it is effective to remove the resin extraneous matter adhered to the surface of the endless metal ring before the rolling step in order to lower the nitriding failure of the endless metal ring. If the resin remains to adhere to the surface of the endless metal ring before the rolling step, the resin could be fixed or stick to the surface of the endless metal ring in the rolling step, and exfoliation of the resin becomes extremely difficult even if the endless metal ring surface is thoroughly washed after the rolling step. Therefore, by removing the resin before the rolling step, fixation of the resin to the endless metal ring surface is prevented, and thereby the nitriding failure can be prevented.

(3) In the endless metal ring manufacturing method according to (1) or (2), preferably, the resin removal step includes soaking the endless metal ring in a decomposition treatment liquid to remove the resin.

According to the aspect described in the above (3), the resin adhered to the endless metal ring is fused to be removed by use of the decomposition treatment liquid and the rolling step is subsequently performed, so that the resin is prevented from being fixed to the endless metal ring surface, resulting in prevention of the nitriding failure.

(4) In the endless metal ring manufacturing method according to (1) or (2), preferably, the resin removal step includes causing a fluid to collide against a surface of the endless metal ring to remove the resin.

According to the aspect described in the above (4), a fluid is caused to collide against the endless metal ring surface by a large flow rate washing, for example, to remove the resin, and the rolling step is subsequently performed, so that the resin is prevented from being fixed to the endless metal ring surface, resulting in prevention of the nitriding failure.

(5) In the endless metal ring manufacturing method according to (1) or (2), preferably, the resin removal step includes soaking the endless metal ring into a liquid to perform ultrasonic washing.

According to the aspect described in the above (5), the endless metal ring surface is subjected to the ultrasonic washing to remove the resin and the rolling step is subsequently performed, so that the resin is prevented from being fixed to the endless metal ring surface, resulting in prevention of the nitriding failure.

(6) In the endless metal ring manufacturing method according to (5), preferably, the resin removal step includes rotating the endless metal ring to wash the endless metal ring.

According to the aspect described in the above (6), the endless metal ring is rotated during the ultrasonic washing in order to change a location of ultrasonic wave irradiated on the endless metal ring surface, and as a result, a location of cavitation generated on the endless metal ring surface is changed. Accordingly, it is possible to facilitate exfoliation of the resin from the endless metal ring surface. In this manner, it is possible to prevent the resin from being fixed to the endless metal ring surface, resulting in prevention of the nitriding failure.

Further, to achieve the above purpose, an endless metal ring resin removal device according to another aspect of the present invention has the following features.

(7) Another aspect of the present invention provides an endless metal ring resin removal device configured to wash and hold an endless metal ring, wherein the endless metal ring resin removal device includes: a holding tool for holding the endless metal ring; a rotation mechanism configured to rotate the endless metal ring in a circumferential direction of the endless metal ring with the holding tool; a washing tank filled with a liquid for ultrasonic washing of the endless metal ring; and an ultrasonic wave generator for performing the ultrasonic washing.

(8) In the endless metal ring resin removal device according to (7), preferably, the ultrasonic wave generator is operated while the rotation mechanism rotates the endless metal ring in the circumferential direction to remove resin having adhered to a surface of the endless metal ring.

According to the aspects described in the above (7) and (8), the endless metal ring is washed while the ring is rotated, so that the resin adhered to the endless metal ring surface can be effectively removed.

BRIEF DESCRIPTION OF THE DRAWINGS

FIG. 15 is a table showing washing results of the endless metal ring in the first embodiment.

MODE FOR CARRYING OUT THE INVENTION

A first embodiment of the present invention is now explained referring to the accompanying drawings.

Figure 1:
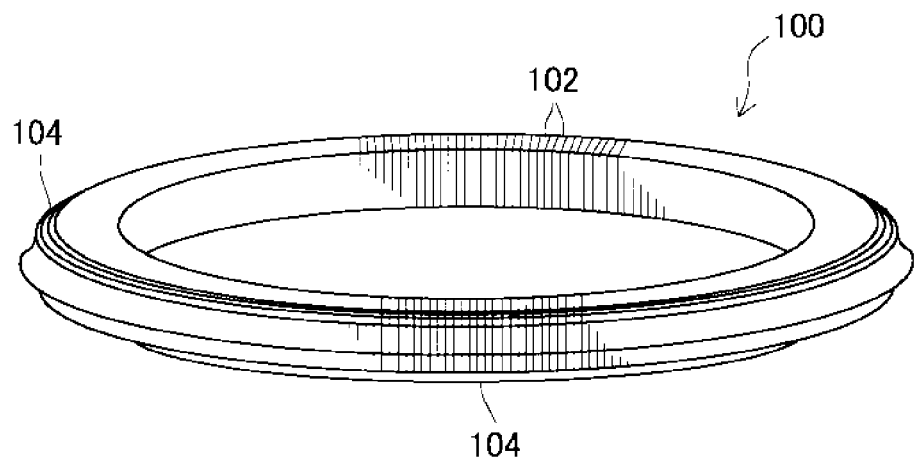
FIG. 1 is a perspective view of a CVT ring in a first embodiment.
Figure 2:
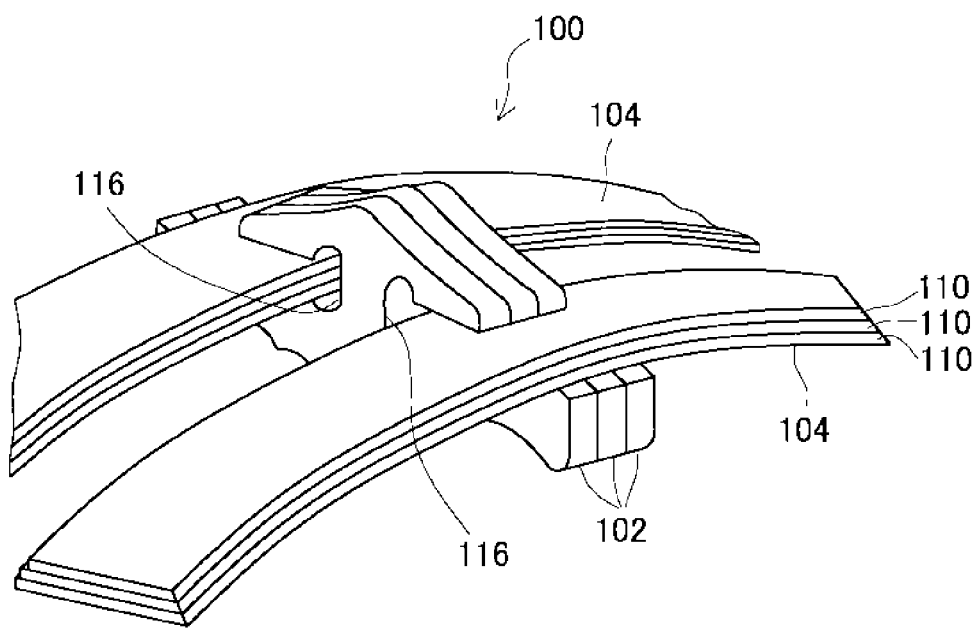
FIG. 2 is an exploded perspective view of the CVT ring in the first embodiment.

FIG. 1 is a perspective view of a CVT ring 100 in the first embodiment. FIG. 2 is an exploded perspective view of the CVT ring 100. The CVT ring 100 is formed of a laminated ring 104 and a plurality of elements 102 stacked in a thickness direction thereof The laminated ring 104 is formed by laminating nine layers of endless metal rings 110, each layer having the different circumferential length. In FIG. 2, the endless metal rings 110 are omitted partly and illustrated by only three layers thereof for explanation. The adjacent endless metal rings 110 are each designed to have different inner diameters by the thickness of each endless metal ring 110. Accordingly, the overlapped endless metal rings 110 are laminated with no clearance. The elements 102 are each made of plate-like metal material formed at both ends with grooves 116, and the laminated rings 104 are inserted in these grooves 116 as shown in FIG. 2.

Figure 3:
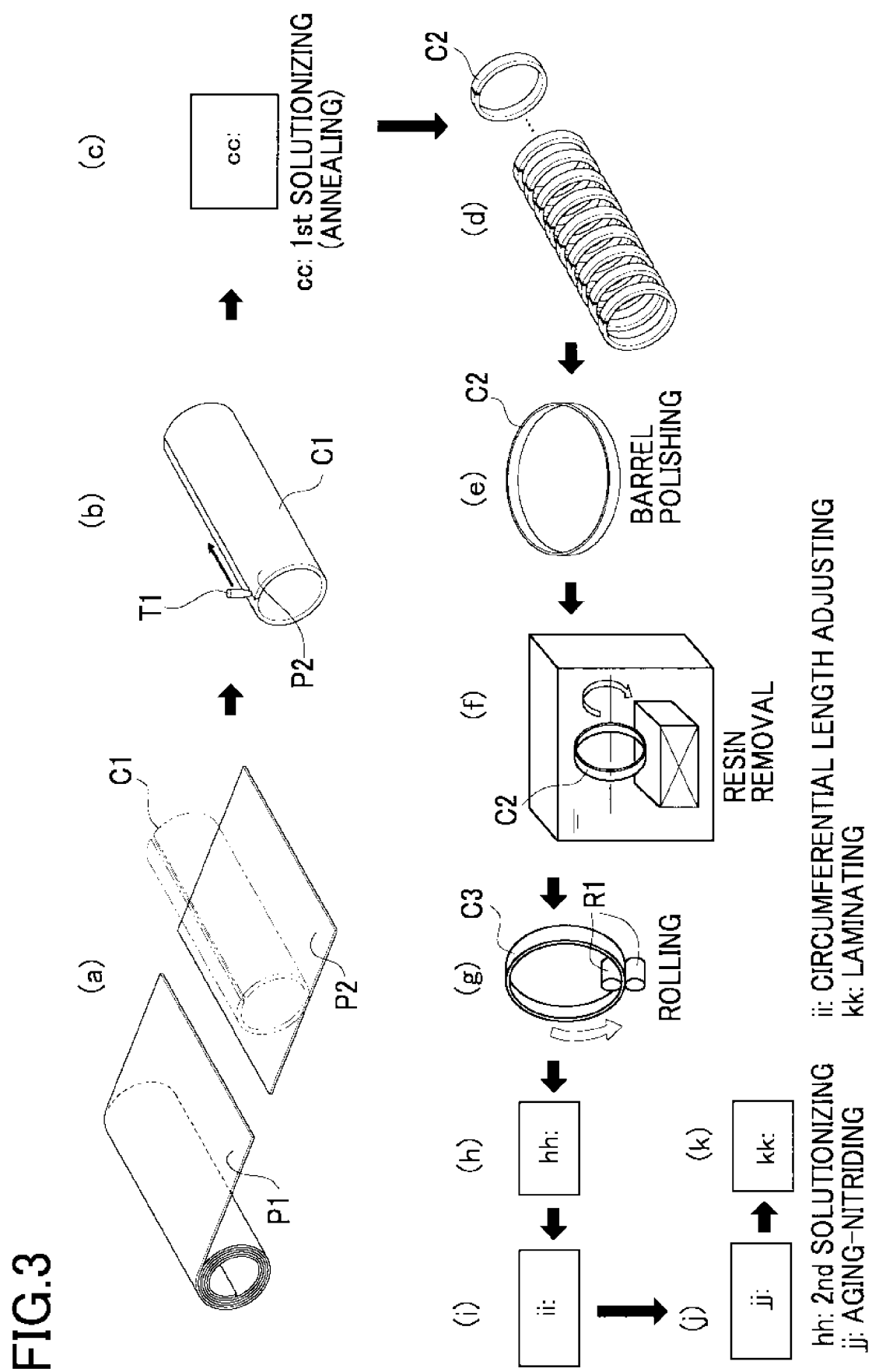
FIG. 3 is an explanatory view explaining a manufacturing process of an endless metal ring in the first embodiment, in which (a) is a strip cutting step, (b) is a strip welding step, (c) is a first solutionizing step, (d) is a cylindrical body cutting step, (e) is a barrel polishing step, (f) is a washing step, (g) is a rolling step, (h) is a second solutionizing step, (i) is a circumferential length adjusting step, (j) is an aging and nitriding step, and (k) is a laminating step.

FIG. 3 is a schematic view for explaining a manufacturing process for the endless metal ring 110. In FIG. 3, (a) is a strip cutting step pr1, (b) is a strip welding step pr2, (c) is a first solutionizing step pr3, (d) is a cylindrical body cutting step pr4, (e) is a barrel polishing step pr5, (f) is a resin removal step pr6, (g) is a rolling step pr7, (h) is a second solutionizing step pr8, (i) is a circumferential length adjusting step pr9, (j) is an aging-nitriding step pr10, and (k) is a laminating step pr11. For manufacturing the endless metal ring 110, as shown in FIG. 3(a), a strip plate P2 is cut out from a material roll P1 to a specified length in the strip cutting step pr1. High-tensile steel such as maraging steel is used for the material roll P1. This material roll P1 is uncoiled to be flattened, and then cut with a predetermined width to form the strip plate P2. The width of the strip plate P2 is determined in consideration of being subject to subsequent process such as the rolling step pr7.

Then, in the strip welding step pr2 shown in FIG. 3(b), a cylindrical body C1 formed by roll-bending the strip plate P2 is welded by abutting its end faces to form the cylindrical body C1 of cylindrical shape. In the first solutionizing step pr3 shown in FIG. 3(c), the cylindrical body C1 is solutionized under nitride atmosphere. By this solutionizing, structure anisotropy of the welded portion is relaxed. In the cylindrical body cutting step pr4 shown in FIG. 3(d), the cylindrical body C1 is cut into round slices each having a predetermined width to make a material ring C2. Since burrs are generated on end faces of the material ring C2 in the process of cutting the cylindrical body C2 into round slices, the barrel polishing step pr5 shown in FIG. 3(e) is performed to remove the burrs generated on the end faces of the material ring C2. What is used in the barrel polishing step pr5 is resin media in which alumina abrasive grain with a prescribed grain diameter is mixed with a resin-based binder.

Then, in the resin removal step pr6 shown in FIG. 3(f), the material ring C2 after barrel polishing is cleaned. This resin removal step pr6 will be explained later. In the rolling step pr7 shown in FIG. 3(g), a thickness of the material ring C2 is adjusted. Even though the material roll P1 is provided to have a thickness as uniform as possible, the rolling step pr7 of rolling the material ring C2 by use of rolling rollers R1 is performed in order to correct a deviation in the thickness direction, thickness variation and minute deformation in the strip welding step pr2 and the cylindrical body cutting step pr4, and influence in the barrel polishing step pr5. A rolled ring C3 formed in this step has a thickness set assuming that a circumferential length is to be elongated in the subsequent circumferential length adjusting step pr9.

Figure 4:
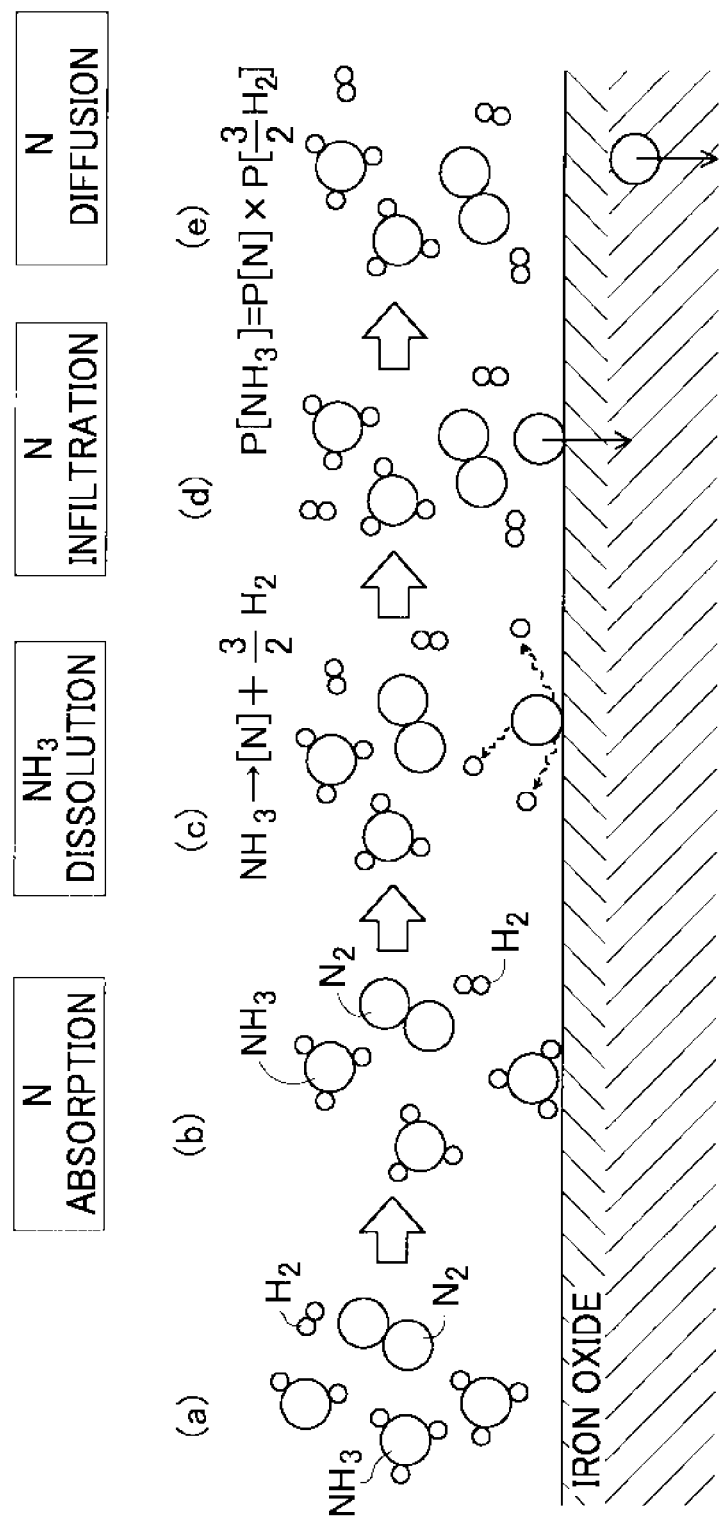
FIG. 4 is a diagram showing a carbo-nitriding mechanism in the first embodiment, in which (a) is an ammonia gas charging step, (b) is a nitrogen adsorption step, (c) is an ammonia dissolution step, (d) is a nitrogen infiltration step, and (e) is a nitrogen diffusion step.

In the second solutionizing step pr8 indicated in FIG. 3(h), the rolled ring C3 is heated in a furnace at a predetermined temperature for a predetermined period of time. This solutionizing process is aimed for homogenization. In the circumferential length adjusting step pr9 shown in FIG. 3(i), each of the rolled rings C3 is adjusted to a required circumferential length, and then the endless metal ring 110 is formed. Then, a carbo-nitriding treatment is performed in the aging-nitriding step pr10 indicated in FIG. 3(j). FIG. 4 is a diagram showing a carbo-nitriding mechanism. In FIG. 4, (a) is an ammonia gas charging step, (b) is a nitrogen adsorption step, (c) is an ammonia dissolution step, (d) is a nitrogen infiltration step, and (e) is a nitrogen diffusion step. The endless metal ring 110 set in a not-shown pressure-reduced furnace is placed under ammonia gas atmosphere in "the ammonia gas charging step" in FIG. 4(a).

When the temperature in the furnace is raised after that, ammonia molecules adhere to a surface of the endless metal ring 110 in "the nitrogen adsorption step" in FIG. 4(b). Then, as shown in "the nitrogen dissolution step" in FIG. 4(c), the ammonia molecules dissolved on the surface of the endless metal ring 110 are decomposed to nitrogen and hydrogen. The nitrogen reacts with minute particles in the endless metal ring 110 and then enters into the endless metal ring 110 from its surface as indicated in "the nitrogen infiltration step" in FIG. 4(d). This reaction occurs because of the influence of components that have high affinity with nitrogen among elements included in the steel material. The nitrogen is diffused mainly from a grain boundary of the endless metal ring 110 in "the nitrogen diffusion step" in FIG. 4(e), and as a result, the effect of hardening the surface of the endless metal ring 110 is obtained.

Thus formulated endless metal rings 110 are laminated in the laminating step pr11 shown in FIG. 3(k). In the first embodiment, the endless metal rings 110 are laminated in nine layers to form the laminated ring 104. The thus laminated ring 104 is utilized to form the CVT ring 100 by combination with the elements 102 as shown in FIG. 2.

Figure 5:
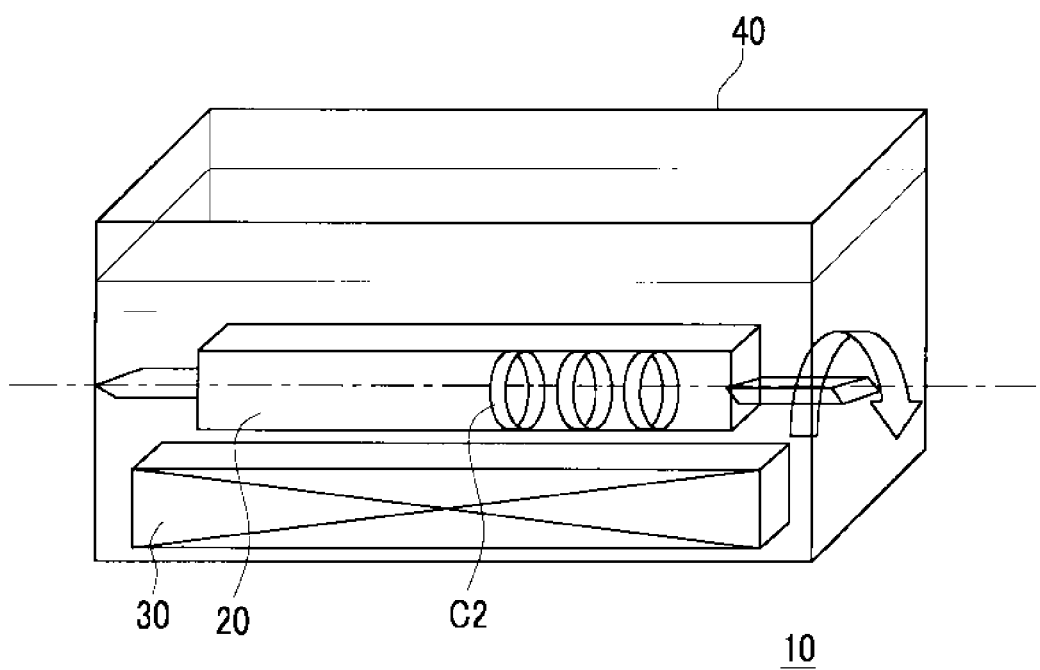
FIG. 5 is a schematic view of a washing device in the first embodiment.
Figure 6:
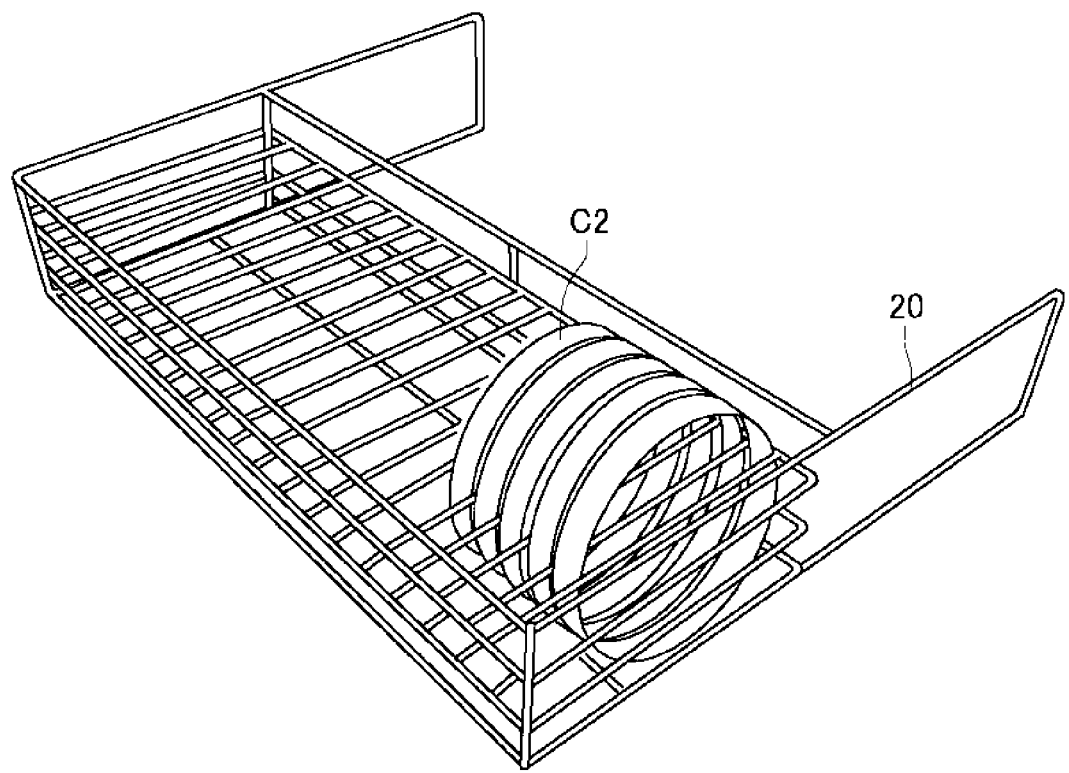
FIG. 6 is a perspective view of a washing jig in the first embodiment.

FIG. 5 is a schematic view showing a washing device 10. FIG. 6 is a perspective view showing a washing jig 20. The washing device 10 used in the resin removal step pr6 is configured such that the washing jig 20 shown in FIG. 6 is held in a rotatable manner in a washing tank 40 filled with water for washing, and an ultrasonic wave generator 30 is placed below the washing jig 20. The washing jig 20 is a basket made of thin wire to hold the material rings C2 as shown in FIG. 6, and the washing jig 20 is covered with an unillustrated lid and fixed in the washing device 10. The washing jig 20 provided in the washing device 10 is provided with a not-shown rotation mechanism so that the jig 20 rotates about an axis of the material ring C2. The ultrasonic wave generator 30 is placed to generate ultrasonic wave from below the washing jig 20. In this manner, the material ring C2 after the barrel polishing step pr5 is washed.

According to the above configuration of the manufacturing method of the endless metal ring 110 in the first embodiment, the following operations and effects are obtained.

The method of manufacturing the endless metal ring 110 in the first embodiment is the method for manufacturing the endless metal ring 110 through the process of: the barrel polishing step pr5 of polishing the material ring C2 (the endless metal ring 110) by use of a barrel made of resin; the rolling step pr7 of rolling the washed material ring C2 (the endless metal ring 110); and the nitriding step pr10 of nitriding the rolled ring C3 (the endless metal ring 110) which has been rolled. The method includes the resin removal step pr6 of removing the resin adhered to the material ring C2 (the endless metal ring 110) after the barrel polishing step pr5 and before the rolling step pr7.

For manufacturing the endless metal ring 110, the applicant examined the surface of the endless metal ring 110 after the nitriding step pr10 and confirmed that the surface is shaded or mottled with black speckles or specks and white speckles and that thus mottled portion is low in its hardness compared to other portions on the surface. Generally, nitrogen are diffused into the grain boundary from a surface layer of the endless metal ring 110 by "the nitrogen diffusion step" shown in FIG. 4(e) so that a nitride layer r2 is formed. As a result, the surface of the endless metal ring 110 is hardened. However, the mottled portion with the black and white speckles has low hardness and thus the nitride failure is conceived to have occurred. This failure in the surface hardness leads to product defect in the endless metal ring 110, lowering product yield. When the surface of the endless metal ring 110 is processed with shot peening as shown in FIG. 7(g) and FIG. 8(f) which will be mentioned later, the surface hardness failure further cause surface asperities.

Conventionally, some measures have been taken, for example, a manufacturing process is conducted in a clean room and humidity control is performed for static electricity prevention in order to solve the above problem. These measures are intended to prevent adhesion of dirt or wastes generated in the manufacturing process as much as possible since the nitriding failure has been considered to result from adhesion of the dirt or wastes to the surface of the endless metal ring 110 due to static electricity.

Figure 9:
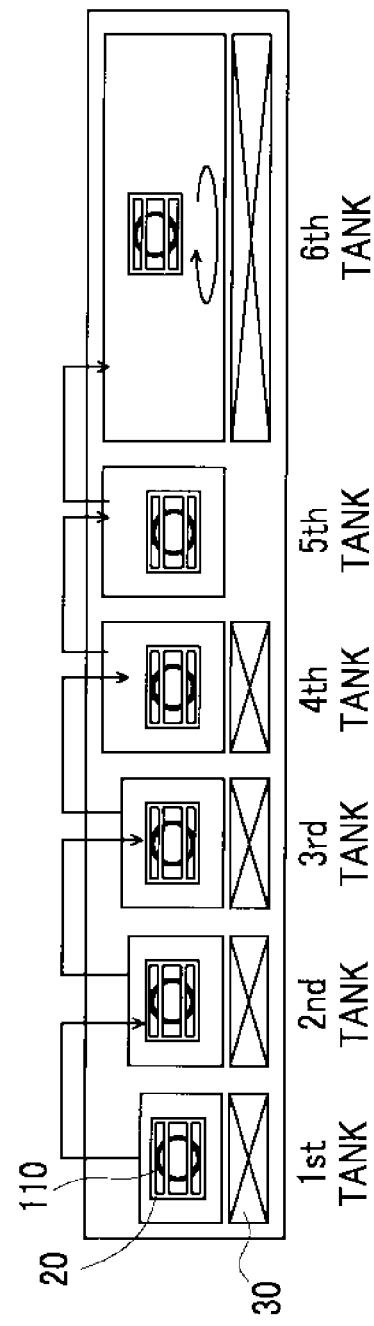
FIG. 9 is a schematic view of a configuration of a six-tank washing for explanation.

However, even if the above measures are taken and the ring is carefully washed in the washing process corresponding to the resin removal step pr6, the nitriding failure has occurred at a certain ratio. FIG. 9 is a schematic view showing a configuration of six-tank washing for comparison. Conventionally, the endless metal ring 110 was carefully washed through the six-tank washing process as shown in FIG. 9 after the barrel polishing step pr5. Through the first to fourth tanks, the endless metal ring 110 is washed by the combination of ultrasonic washing using pure water and oscillation. The endless metal ring 110 is then washed with pure water in the fifth tank and applied with spin-dry to spin off drops of water by rotating the ring 110 at high speed in the sixth tank. Even by this washing method, it is hard to prevent the nitriding failure. Accordingly, the present applicant has analyzed foreign matters detected after washing by the six-tank washing and noticed the fact that a large number of resin components are detected from the foreign matters.

This resin component is considered to be mainly derived from the media used in the barrel polishing step pr5. Accordingly, in the first embodiment, the resin removal step pr6 is performed before the rolling step pr7 to wash the endless metal ring 110 by use of the washing device 10 and the washing jig 20 shown in FIGS. 5 and 6. As a result, it is confirmed that the resin can be preferably removed.

Figure 7:
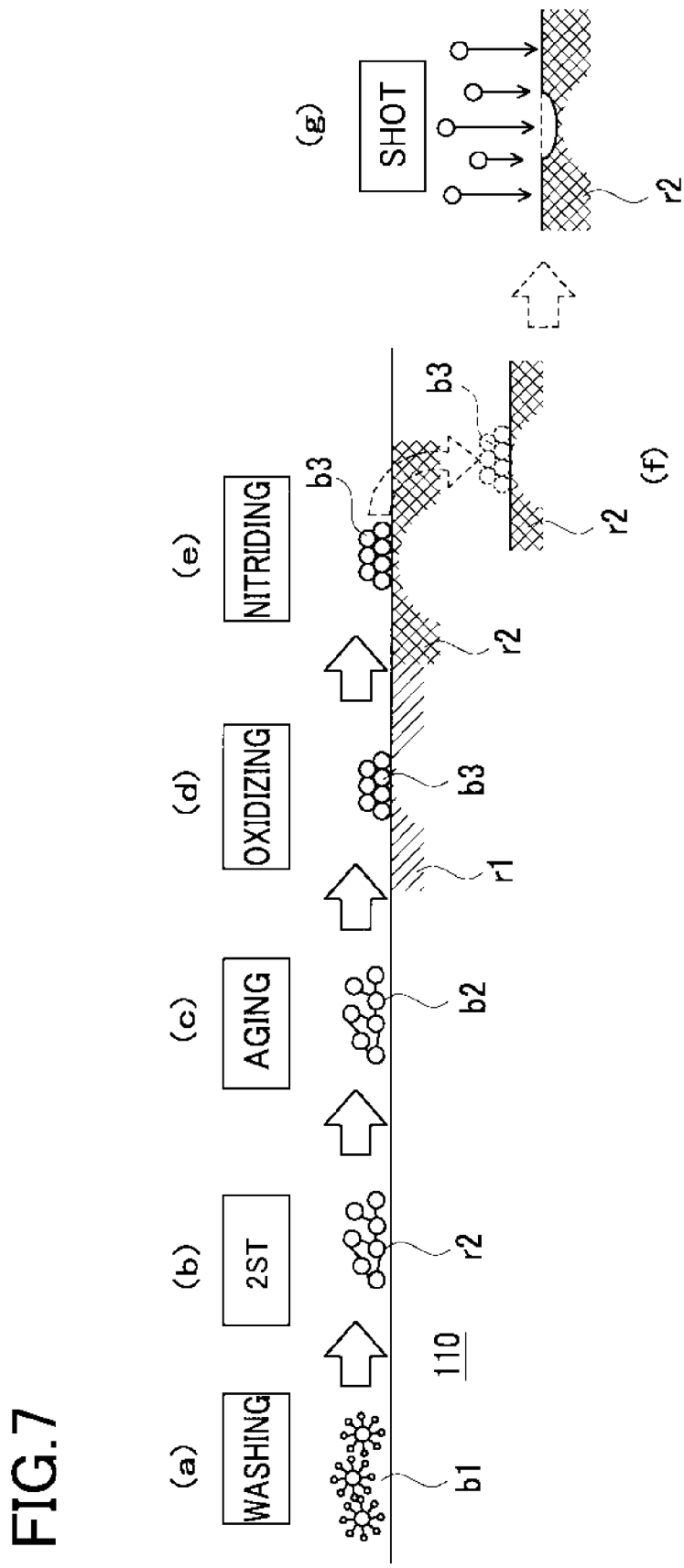
FIG. 7 is a diagram showing a first model of nitriding failure for explanation.

FIG. 7 is a diagram showing a first model having the nitriding failure caused therein for explanation. In FIG. 7(a), washing failure causes emulsification of resin wastes, rolling oil, and compounds which are mixed with dust generated during the process and adhere to the surface of the endless metal ring 110. It is expected that this emulsified substance b1 turns into a carbon-based high polymer b2 in (b) indicating a timing of the first solutionizing step pr3 and this polymer b2 sticks to the surface of the endless metal ring 110. Then, the carbon-based high polymer b2 turns into a carbide substance b3 in an aging process (c). This carbide substance b3 obstructs creation of an iron oxide layer r1 which is to be formed on the surface of the endless metal ring 110 in an oxidizing process (d). Also when a nitride layer r2 is formed in a nitriding process (e), the carbide substance b3 partly obstructs creation of the nitride layer r2 by interrupting carbo-nitriding indicated in FIG. 4(d). This obstruction is considered to cause the black speckles on the endless metal ring 110 surface.

At that time, if the carbide substance b3 is peeled off due to some reasons as indicated in (f), it may lead to generation of the white speckles. The endless metal ring 110 formed in this manner could have the low surface hardness due to the nitriding failure in portions of the black speckles and the white speckles. Further, in a case that a shot peening process is performed before the laminating process pr11 thereafter, there are created partial unevenness as indicated in (g), which is not preferable.

Figure 8:
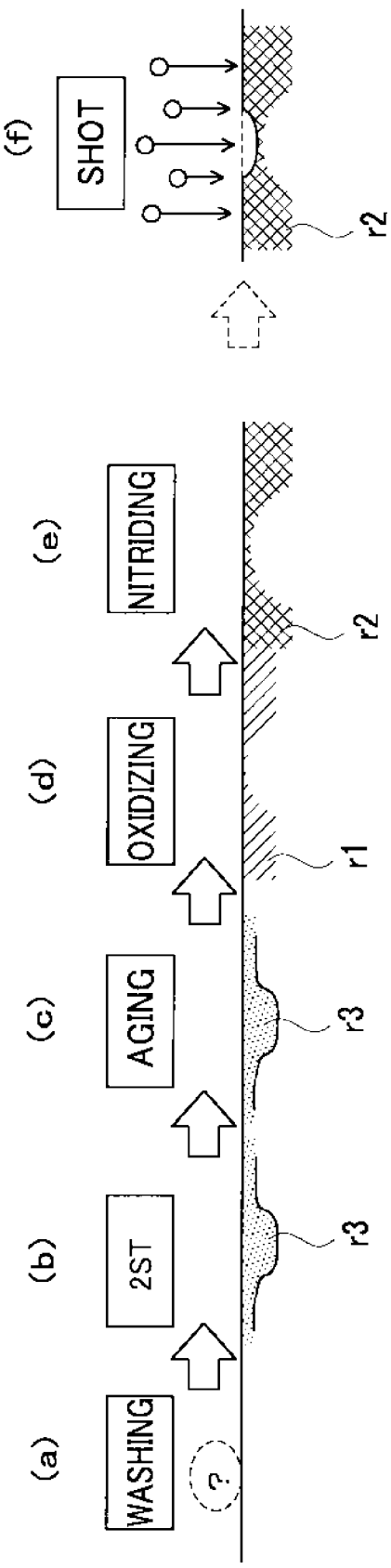
FIG. 8 is a diagram showing a second model of nitriding failure for explanation.

FIG. 8 is a diagram showing a second model having the nitriding failure occurred therein. Unlike the first model of the nitriding failure, no obvious reason to cause the failure is found, but an oxide layer r3 of such as titanium is formed on the endless metal ring 110 surface in a solutionizing process (b), and this oxide layer has an influence of obstructing creation of the iron oxide layer r1 as indicated in the following (d). As a result, the nitriding failure indicated in (e) is considered to occur. Further, when the shot peening process is performed as indicated in (f), partial unevenness could be generated, which is not preferable.

Figure 10:
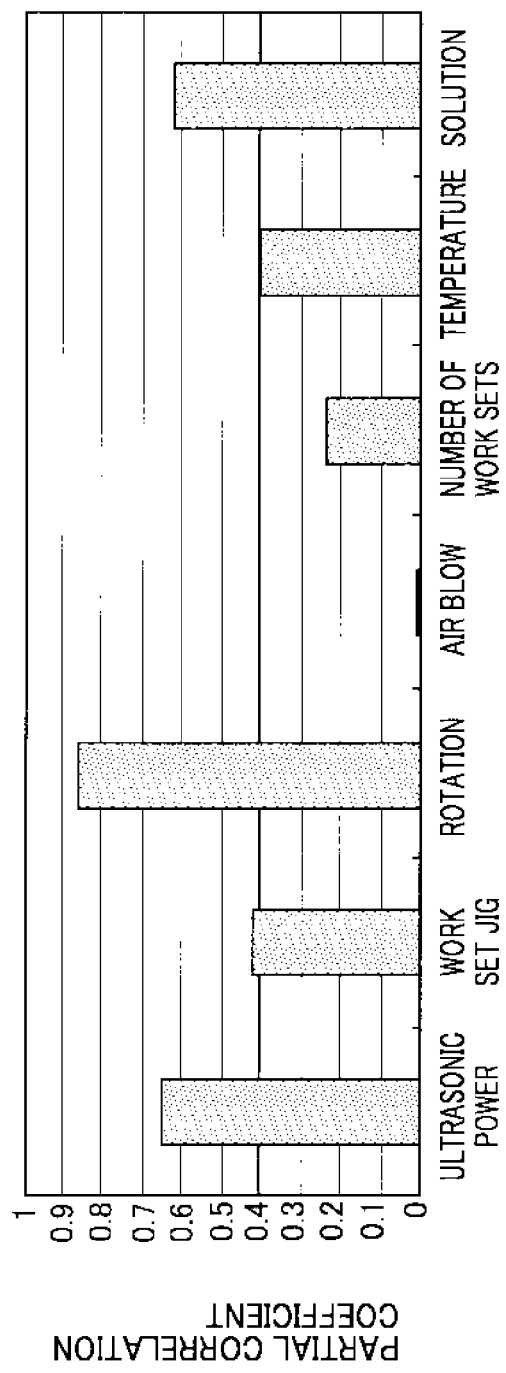
FIG. 10 is a graph showing results of resin removal tests conducted by the applicant.

FIG. 10 is a graph showing results of resin removal tests in which the washing device of the first embodiment is used under different washing conditions. The applicant has confirmed from the resin removal tests that the washing device 10 can be applied to any one or the whole of the first to fourth tanks of the washing tank shown in FIG. 9, and that the efficiency in resin removal changes depending on the washing conditions. The graph of FIG. 10 is indicated with its vertical axis indicating a partial correlation coefficient and its horizontal axis indicating test conditions. The test results are obtained by further performing ultrasonic washing with carbon tetrachloride solution, filtrating the solution with a filter, and then evaluating a resin waste amount in the filter after washing so that the grading is made.

"Ultrasonic power" is an element indicating an influence of an ultrasonic power output w/L, and "Work set jig" is an element indicating the influence of using jigs different in shape, material, or the like. From the test results, it is confirmed that increasing energy per unit area from 8 w/L to 24 w/L, could improve detergency by three ranks.

Figure 11:
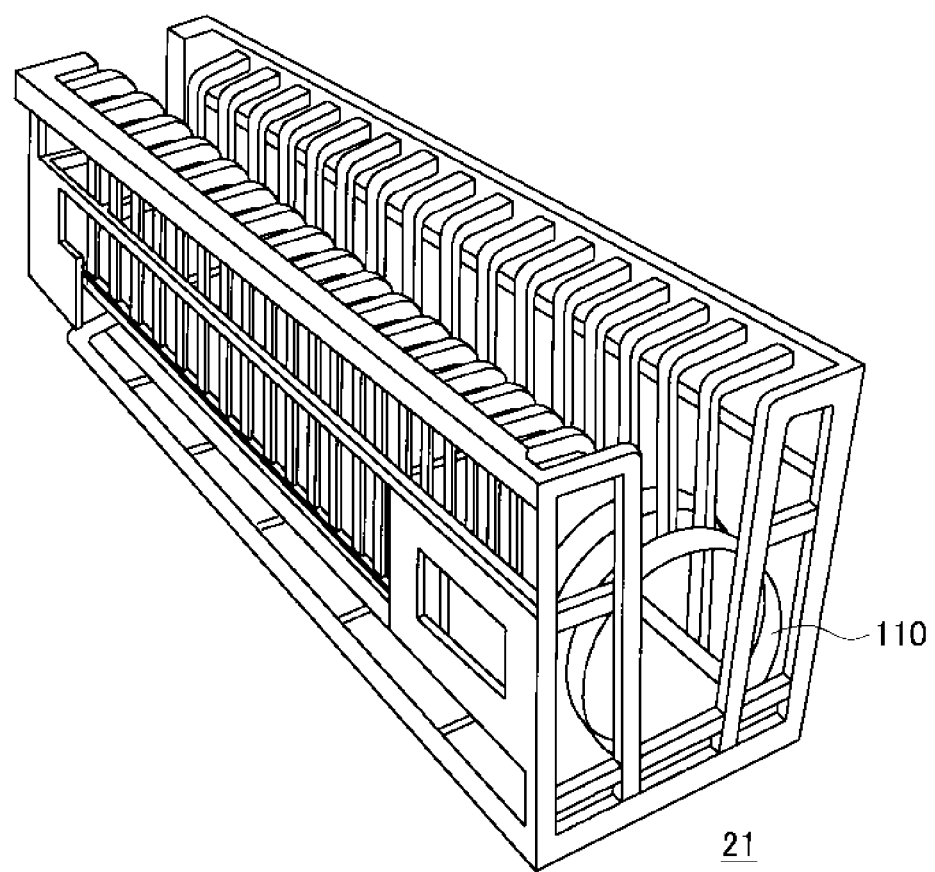
FIG. 11 is a perspective view of a washing jig for explanation.

FIG. 11 shows a jig which has been conventionally used. A jig 21 made of resin is configured with a thick frame with high rigidity compared to the washing jig 20. Both the jig 21 and the washing jig 20 are capable of accommodating the same number of the endless metal rings 110. As for "Work set jig," tests are made with the jig 21 shown in FIG. 11, the washing jig 20, and without using a jig. What is the most effective in washing is the case when the ring is washed without using any jig, and the washing effect gradually becomes low in the order of using the washing jig 20 and using the jig 21. This is because the high washing effect is obtained when there is no jig which interrupts the ultrasonic wave.

"Rotation" is an element indicating an influence of performing or not performing rotation by the washing jig 20. Compared to not performing the rotation, washing with rotation exhibits higher washing effect by about four ranks. "Air blow" is an element indicating an influence of air blowing on the surface of the endless metal ring 110 after the ultrasonic washing for comparison. It is confirmed that resin on the endless metal ring 110 surface is not removed by the air blow. "Number of work sets" is an element indicating an influence of changing the number of the endless metal rings 110 accommodated in the washing jig 20. It is confirmed that the washing effect is not largely influenced by the number of the work sets.

"Temperature" is an element indicating an influence of the temperature of a solution used for washing the endless metal ring 110. As a result of tests made by changing the temperature from the room temperature in several different patterns, it is confirmed that the washing effect is improved by raising the temperature to a certain degree. "Solution" is an element indicating an influence of types of the solution filled in the washing tank 40 of the washing device 10. As the solution, pure water and hydrocarbon-related solution are used for the tests. These tests revealed that, compared to the pure water, the hydrocarbon-related solution hardly makes the washing effects, and the hydrocarbon-related solution is less effective by five ranks compared to the pure water.

As results from this research, as shown in FIG. 10, the elements of "Ultrasonic power," "Work set jig," "Rotation," "Temperature," and "Solution" have the partial correlation coefficient of more than 0.4, and it is concluded that they are effective. From these results, in the first embodiment, the washing jig 20 shown in FIG. 6 is employed as the work set jig to be rotated as shown in FIG. 4 so as to increase the ultrasonic power, and water is employed as the solution so that the washing effect of washing the resin dusts is further increased. Namely, the washing device 10 is thus arranged so that the resin dusts are further effectively removed from the endless metal ring 110 surface, realizing decrease in the nitriding failure of the endless metal ring 110. The applicant has confirmed that by embodying the invention as the first embodiment, a nitriding failure ratio of the endless metal ring 100 is reduced to almost zero while the ratio is used to be about 40%. Consequently, the present invention can attribute to cost reduction in producing the endless metal ring 110.

FIG. 15 is a table showing that a rank of the washing effect varies in accordance with test conditions. In a row indicated with "Comparative example," the jig 21 shown in FIG. 11 is used and a result of the six-tank washing illustrated in FIG. 9 in which the washing is performed without rotating the jig 21 is indicated. In the table, the steps in the fifth and sixth tanks are omitted. A row indicated as "Test 1" shows the result of washing performed by the washing jig 20 shown in FIG. 6 while the jig 20 is rotated to wash the ring through the first to third tanks. A row indicated as "Test 2" shows the result of washing performed on the same condition with "Test 1" while the jig 20 is used through the first to fourth tanks. A row indicated as "Test 3" shows the result of washing performed by increasing the output from the ultrasonic wave generator 30 on the same condition with "Test 1." A row indicated as "Test 4" shows the result of washing performed by increasing the output from the ultrasonic wave generator 30 on the same condition with "Test 2." Every one of the tests are made with one hundred material rings C2 and washing with pure water to compare the washing effect.

According to the table, under the condition indicated in "Comparative example," the washing effect is graded low as ninth with regard to the resin dust. On the other hand, the washing result of "Test 1" is graded as a rank 4, "Test 2" is graded as 2, "Test 3" is graded as 1, and "Test 4" is graded as 1. The rank 1 of the washing effect means that no nitriding failure is confirmed in the endless metal ring 110. In other words, the washing effect is improved by the washing method for the endless metal ring 110 (the material ring C2) according to the first embodiment in which the output of the ultrasonic wave generator 30 is increased from 8 w/L to 24 w/l, and the ring C2 is rotated and washed by the washing jig 20. As a result, the number of the washing tanks 40 can be reduced. Accordingly, a lead time for manufacturing the endless metal ring 110 is shortened, thus reducing the manufacturing cost. Further, it is possible to contribute to extending the life expectancy of the CVT ring 100.

Next, a second embodiment of the present invention is explained with reference to the accompanying drawings. A configuration is similar to the first embodiment except a resin removal step pr6, and therefore only the different features are explained.

Figure 12:
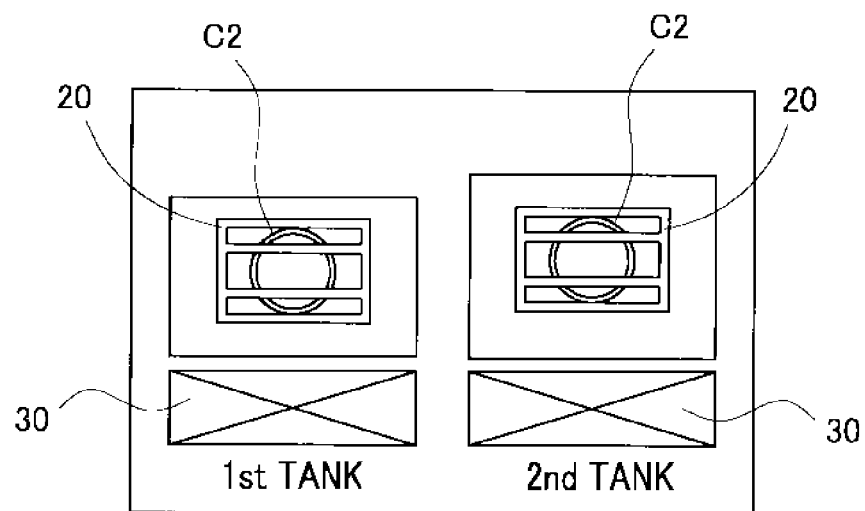
FIG. 12 is a schematic plan view of a washing device in a second embodiment.
Figure 13:
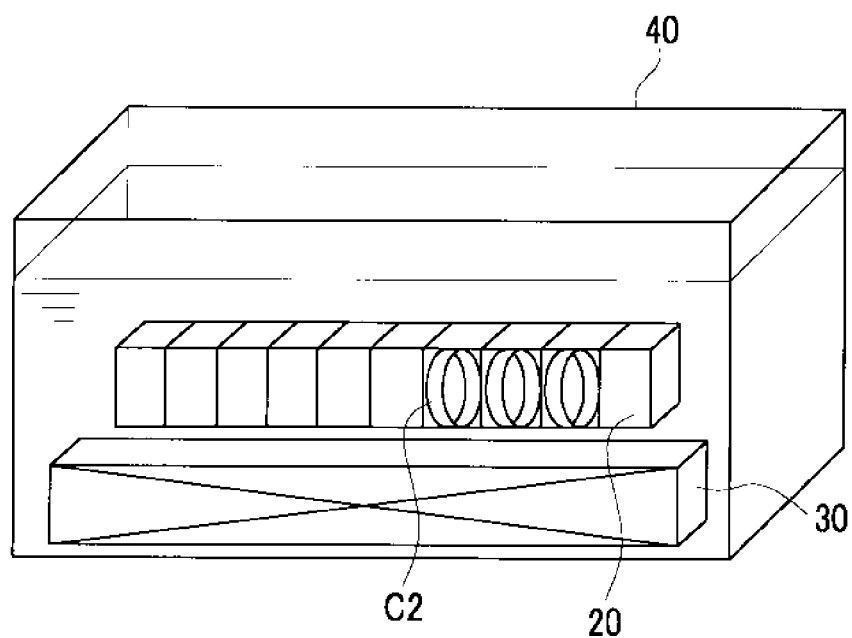
FIG. 13 is a schematic perspective view of the washing device in the second embodiment.

FIG. 12 is a schematic plan view of a washing device according to the second embodiment. FIG. 13 is a schematic perspective view of the washing device. In the second embodiment, a carbon tetrachloride solution is used for washing the endless metal ring 110 (the material ring C2). The washing tank 40 shown in FIG. 12 as a first tank is filled with the carbon tetrachloride solution to wash the endless metal ring 110 (the material ring C2). In washing, the material ring C2 may be held by the washing jig 20 and rotated as necessary. Further, the ultrasonic wave generator 30 is also provided in the washing tank 40. Another washing tank 40 as a second tank shown in FIG. 12 is filled with pure water and the ultrasonic washing is performed by the ultrasonic wave generator 30 as similar to the first tank. The ultrasonic washing is thus performed by the ultrasonic wave generator 30 while the material ring C2 is soaked in a decomposition-removal liquid in order to dissolve and remove the resin adhered to the endless metal ring 110 surface. As long as the solution used for washing is the one capable of dissolving and removing the resin, the solution is not limited to the carbon tetrachloride solution and other decomposition-removal liquid capable of dissolving and removing the resin may be used.

Next, a third embodiment of the present invention is explained with reference to the accompanying drawings. A configuration is similar to the first embodiment except a resin removal step pr6, and therefore only the different features are explained.

Figure 14:
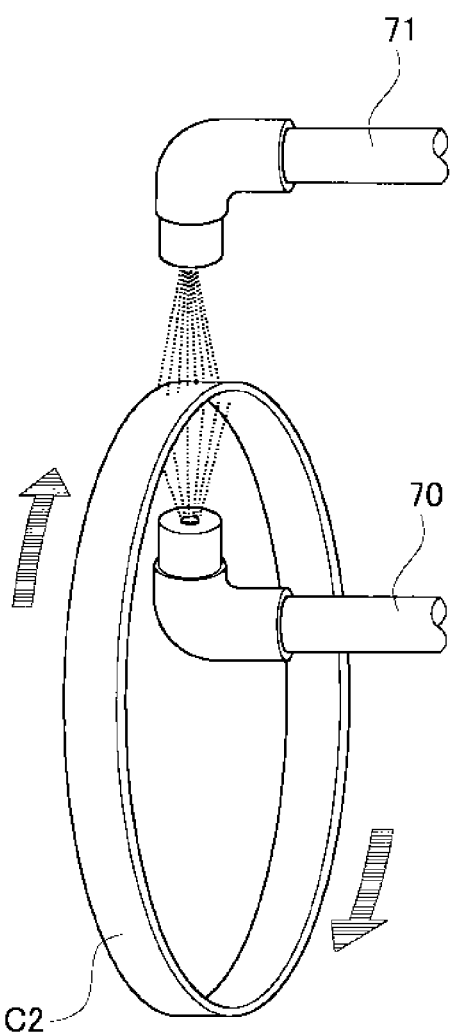
FIG. 14 is a perspective view showing an image of washing an endless metal ring in a third embodiment.

FIG. 14 is a perspective view showing a washing image of an endless metal ring in the third embodiment. The third embodiment is configured such that the surface of the endless metal ring 110 (the material ring C2) is washed away by high-pressure washing. An inner surface washing nozzle 70 is provided inside the washing tank 40 of the washing device 10 and an outer surface washing nozzle 71 is provided to be directed to an outer circumferential surface so that the endless metal ring 110 surface is washed with the pressure of at least about some tens of MPa. As an alternative, the surface of the material ring C2 may be washed by employing the method of washing at large flow rate with the pressure of about some tens to some hundreds of L/min. In this case, the washing tank 40 does not have to be provided with the ultrasonic wave generator 30, and it is possible to remove the resin adhered to the surface of the material ring C2 by washing outer and inner circumferential surfaces of the endless metal ring 110 with the washing liquid such as pure water sprayed from the nozzles.

From the above mentioned test results, it is confirmed that washing with the washing liquid at high temperature is also effective, and therefore, it is possible to remove the resin from the endless material ring C2 surface by steam-washing the material ring C2 surface by the same nozzles. Thus, by washing the material ring C2 surface with a fluid, it is possible in the resin removal step pr6 to wash away particles of the resin media that adhered to the material ring C2 surface in the barrel polishing step pr5.

According to the washing device 10 and the washing method of the second or the third embodiment, the same effect as the first embodiment can be obtained, and it is possible to reduce the nitriding failure of the endless metal ring 110 as a result. Specifically, providing the resin removal step pr6 for removing the resin dust which is considered to adhere to the endless metal ring 110 surface can realize great reduction in the nitriding failure of the endless metal ring 110.

The present invention is illustrated in accordance with the embodiments, but the invention is not limited to the above mentioned embodiments and may be appropriately modified with its part of configuration without departing from the scope of the invention. For example, the manufacturing steps of the endless metal ring 110 are illustrated in FIG. 3, but the steps may be increased or reduced and may be replaced with its order as long as the resin removal step pr6 is performed after the barrel polishing step pr5, which is performed after the cylindrical body cutting step pr4 for cutting the cylindrical body C1, and before the second solutionizing step pr8. As mentioned above, it is preferable that the resin removal step pr6 is performed before the rolling step pr7, but even in a case that the resin removal step pr6 is performed after the rolling step pr7, for example, the resin removal effect can be expected to a certain degree.

The shape of the CVT ring 100 is also only an example for illustration, and the present invention may be applied to a CVT ring in which a shape of the element 102 is different from that of the present invention as corresponding to the laminating number of the laminated rings 104. Further, the shape and others of the washing jig 20 may also be modified. In modifying, it is preferable to configure the flame of the washing jig 20 as thin to reduce a portion of the flame that covers the material ring C2 to the most extent so that the ultrasonic wave generated from the ultrasonic wave generator 30 is not interrupted.

REFERENCE SIGNS LIST

10 Washing device
20 Washing jig
21 Jig
30 Ultrasonic wave generator
40 Washing tank
100 CVT ring
102 Element
104 Laminated ring
110 Endless metal ring
116 Groove The inventioin claimed is:

1. An endless metal ring manufacturing method including: a barrel polishing step of polishing an endless metal ring by use of a barrel made of resin; a rolling step of rolling the endless metal ring having been washed; and a nitriding step of nitriding the rolled endless metal ring, wherein the manufacturing method further includes a resin removal step of removing the resin that has adhered to the endless metal ring, the resin removal step is performed after the barrel polishing step and before the rolling step, the resin removal step includes soaking the endless metal ring into a liquid to perform ultrasonic washing, the resin removal step includes rotating the endless metal ring in a circumferential direction about an axis of the endless metal ring to perform the ultrasonic washing of the endless metal ring from an outside of the endless metal ring, washing an inner surface of the endless metal ring using an inner surface washing nozzle, and washing an outer surface of the endless metal ring using an outer surface washing nozzle, the outer surface washing nozzle is placed to face the outer surface of the endless metal ring, the inner surface washing nozzle is placed to face the inner surface of the endless metal ring, and the outer surface washing nozzle and the inner surface washing nozzle are placed to face each other with the endless metal ring held therebetween, the endless metal ring is held in a washing jig such that a part of the endless metal ring protrudes outside an outermost part of the washing jig during the ultrasonic washing in the resin removal step, and the washing jig is a basket made of wire.

2. The endless metal ring manufacturing method according to claim 1, wherein
the resin removal step is a step of performing the ultrasonic washing in a direction perpendicular to an axial direction of the endless metal ring.

* * * * *